No. 675,708. Patented June 4, 1901.
J. R. BLACKWELL.
BATTERY TRAY.
(Application filed Feb. 15, 1901.)

(No Model.)

WITNESSES:
John a Bergstrom
C. R. Ferguson

INVENTOR
James R. Blackwell
BY
ATTORNEYS

THE NORRIS PETERS CO., PHOTO-LITHO., WASHINGTON, D. C.

UNITED STATES PATENT OFFICE.

JAMES R. BLACKWELL, OF NEW YORK, N. Y.

BATTERY-TRAY.

SPECIFICATION forming part of Letters Patent No. 675,708, dated June 4, 1901.

Application filed February 15, 1901. Serial No. 47,445. (No model.)

*To all whom it may concern:*

Be it known that I, JAMES R. BLACKWELL, a citizen of the United States, and a resident of the city of New York, borough of Manhattan, in the county and State of New York, have invented a new and Improved Battery-Tray, of which the following is a full, clear, and exact description.

This invention relates to improvements in trays for holding a number of electric-battery cells. An electric battery is generally placed in such position as to be hidden from general view, and it sometimes happens that the working of the apparatus having connection with the battery is interfered with or deranged by the breaking of one of the cells.

The object of my invention, therefore, is to provide a tray for holding a number of cells and having the battery elements in connection with an alarm, so that should a cell be broken its liquid flowing into the tray will cause a current to pass through the alarm, thus giving notice of the break.

I will describe a battery-tray embodying my invention and then point out the novel features in the appended claims.

Reference is to be had to the accompanying drawings, forming a part of this specification, in which similar characters of reference indicate corresponding parts in all the figures.

Figure 1:
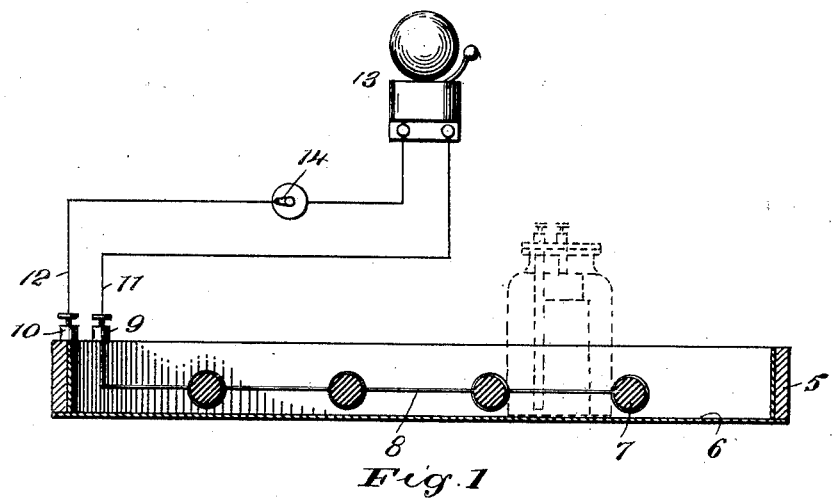
Figure 2:
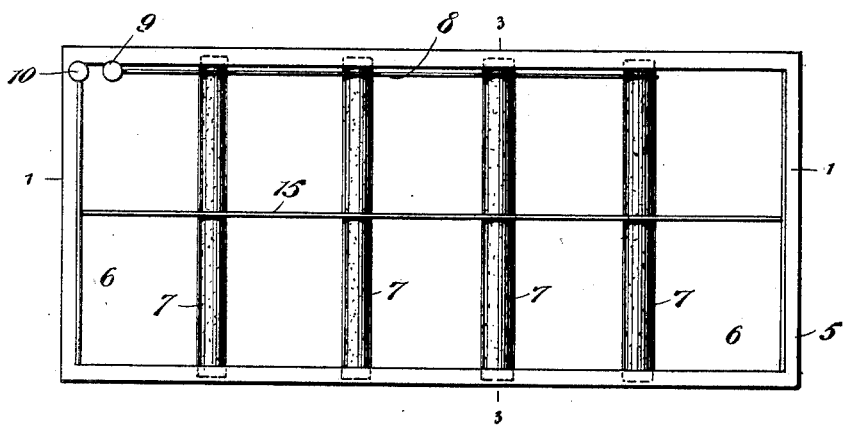
Figure 3:
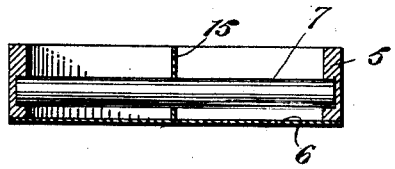

Figure 1 is a section on the line 1 1 of Fig. 2 of a battery-tray embodying my invention. Fig. 2 is a plan view thereof, and Fig. 3 is a section on the line 3 3 of Fig. 2.

The tray comprises a wooden frame 5, having a zinc bottom 6, which forms one element of a battery, and extended across the frame 5 are the other elements of the battery, here shown as carbons 7. The several carbons 7 are connected electrically together by means of a wire 8 or the like, which connects at one end with a binding-post 9, while an upwardly-turned portion of the zinc element 6 has connected with it a binding-post 10. From the binding-posts 9 and 10 wires 11 and 12 lead to an alarm device, here shown as a bell 13. Arranged in the circuit of the bell is a switch 14. Extended lengthwise through the center of the tray is a partition 15, and the carbons 7 pass through this partition. It will be seen that the side walls of the tray, the carbons, and the partition 15 form the walls of several sections, in which the battery-cells may be placed and held separated one from another.

In operation should a cell break its exciting liquid will flow into the tray, causing an electric current to sound the bell 13, thus giving notice of the break.

Having thus described my invention, I claim as new and desire to secure by Letters Patent—

1. The combination with an electric-battery cell, of a holder for the cell adapted to receive the exciting agent of the cell should the cell be broken, electrodes in the holder, and an alarm connecting with the electrodes, substantially as specified.

2. A tray for holding a series of battery-cells, comprising a frame, a zinc bottom in said frame, a number of carbons supported in said frame and out of contact with the zinc, and an alarm device in electric circuit with said zinc and carbons, substantially as specified.

3. A tray for holding a series of battery-cells, comprising a frame, a zinc bottom for said frame, a series of carbons supported transversely in said frame and out of contact with the zinc bottom, an electrical connection between the several carbons, and a bell arranged in the circuit leading from the elements in the tray, substantially as specified.

In testimony whereof I have signed my name to this specification in the presence of two subscribing witnesses.

JAMES R. BLACKWELL.

Witnesses:
 JNO. M. RITTER,
 C. R. FERGUSON.